United States Patent [19]

Mock

[11] Patent Number: 5,439,124
[45] Date of Patent: Aug. 8, 1995

[54] CLOSURE UNIT ON FLOWABLE PRODUCT CONTAINER

[75] Inventor: Elmar Mock, Biel/Bienne, Switzerland

[73] Assignee: Tetra Laval Holdings & Finance S.A., Pully, Switzerland

[21] Appl. No.: 50,417

[22] PCT Filed: Sep. 11, 1992

[86] PCT No.: PCT/CH92/00188

§ 371 Date: May 14, 1993

§ 102(e) Date: May 14, 1993

[87] PCT Pub. No.: WO93/05945

PCT Pub. Date: Apr. 1, 1993

[30] Foreign Application Priority Data

Sep. 17, 1991 [CH] Switzerland ............. 2739/91
Sep. 17, 1991 [CH] Switzerland ............. 2740/91

[51] Int. Cl.6 .................................................. B65D 1/02
[52] U.S. Cl. .................................. 215/40; 215/238;
 215/249; 215/253; 215/261; 220/611; 220/613;
 220/266; 220/268; 220/339; 220/375;
 229/125.04; 229/125.15; 222/461; 222/561;
 222/562
[58] Field of Search ............. 215/31, 32, 237, 238,
 215/249, 250, 253, 261; 220/611, 612, 613, 266,
 268, 269, 276, 339, 375; 229/125.04, 125.15;
 222/461, 561, 562

[56] References Cited

U.S. PATENT DOCUMENTS

| | | |
|---|---|---|
| 3,443,005 | 5/1969 | Braun et al. |
| 3,917,789 | 11/1975 | Heisler . |
| 3,964,609 | 6/1976 | Perrella . |
| 4,082,201 | 4/1978 | Bittel . |
| 4,171,749 | 10/1979 | Obrist et al. |
| 4,391,385 | 7/1983 | Rausing . |
| 4,397,401 | 8/1983 | Ueno et al. |

(List continued on next page.)

FOREIGN PATENT DOCUMENTS

| | | |
|---|---|---|
| 41736 | 8/1971 | Australia . |
| 548148 | 9/1982 | Australia . |
| 555478 | 9/1986 | Australia . |
| 0079676A2 | 5/1983 | European Pat. Off. . |
| 0224593 | 5/1986 | European Pat. Off. . |
| 0268690 | 6/1987 | European Pat. Off. . |
| 0316269 | 10/1988 | European Pat. Off. . |
| 2647077 | 5/1989 | France . |
| 1941479 | 2/1970 | Germany . |
| 2636259 | 5/1977 | Germany . |
| 61-47223(A) | 3/1986 | Japan . |
| WO84/00531 | 7/1983 | WIPO . |
| WO90/14287 | 5/1990 | WIPO . |

Primary Examiner—Allan N. Shoap
Assistant Examiner—Stephen Cronin
Attorney, Agent, or Firm—Frishauf, Holtz, Goodman & Woodward

[57] ABSTRACT

A closure unit for a container for storing and handling flowable products is made from at least two different thermoplastic materials, the different materials fulfilling different functions. A basic thermoplastic material (A.2) is used for sealing against the container (G.2), and an area made of another different thermoplastic material (B.2,C) is provided to fulfill additional sealing functions, to increase mechanical stability, to have a reduced permeability, and to provide increased elasticity for additional opening and closing and/or absorption characteristics. The closure unit is produced by a multimaterial injection molding process, so that contact surfaces between the different thermoplastic materials can be interconnected by reversible or irreversible positive engagement and/or by more or less pronounced melting into one another. The closure unit is in two parts and comprises a pouring part (1.2) and a closure part (2.2), or is in one part. The two-part closure unit is produced in a single operation in a closed state.

16 Claims, 6 Drawing Sheets

U.S. PATENT DOCUMENTS

| | | | |
|---|---|---|---|
| 4,438,864 | 3/1984 | Helms | 220/265 |
| 4,462,504 | 7/1984 | Roth et al. | |
| 4,669,640 | 6/1987 | Ando et al. | |
| 4,711,372 | 12/1987 | Gach | |
| 4,735,335 | 4/1988 | Torterotot | |
| 4,770,325 | 9/1988 | Gordon et al. | |
| 4,795,065 | 1/1989 | Ashizawa et al. | |
| 4,817,816 | 4/1989 | Leseman et al. | 220/359 |
| 4,858,793 | 8/1989 | Stone | |
| 4,887,747 | 12/1989 | Ostrowsky et al. | |
| 4,892,217 | 1/1990 | Shastal | |
| 4,949,882 | 8/1990 | Take | |
| 4,986,465 | 1/1991 | Jacobson et al. | |
| 4,988,012 | 1/1991 | Shastal | |
| 5,054,641 | 10/1991 | Sato | |
| 5,062,542 | 11/1991 | Morton | |
| 5,065,938 | 11/1991 | Anderson | 229/125.08 |
| 5,088,642 | 2/1992 | Fäber | 229/125.14 |
| 5,118,002 | 6/1992 | Sugiyama et al. | 220/359 |
| 5,197,618 | 3/1993 | Goth | |

CLOSURE UNIT ON FLOWABLE PRODUCT CONTAINER

BACKGROUND OF THE INVENTION

The invention is in the field of packing technology and relates to a closure unit for a container for a flowable product, as well as to a production process for said closure unit and a coated cardboard container with a corresponding closure unit.

Containers for flowable products require an opening or a potential opening through which the product can be removed. It is advantageous if, following the first opening, said opening can be resealed, because only then is it possible to handle the container following the first removal of product in the same way as before this has taken place. Therefore most such containers are provided with a closure unit, which can have the most varied forms and shapes and which can be made from the most varied materials. Known examples for such closure units are stoppers made from cork and other materials, screw closures made from plastic or metal, clip or tack closures with ceramic plugs and rubber seals, ground glass stoppers, snap closures made from plastic, etc. Following the initial opening a container without a closure cannot be tightly sealed again. The latter e.g. include glass ampules, many beverage containers made from metal, coated cardboard or plastic.

In the case of containers having a neck, closure units mainly only consist of a closure part, which is mounted on the neck (container closed) or is not located thereon (container open), i.e. which can form a reversible, tight connection with the container. In the case of containers without a neck the closure unit mainly consists of a pouring part (or neck part) and a closure part, the pouring part being connected in a substantially irreversible, tight manner to the container, whereas the closure part and the pouring part together form a reversible, tight connection. In all cases the function of the closure unit is the closing of an opening or potential opening in the container in such a way that the opening can be opened by simple manipulations and then resealed. The closure unit is so designed that between the closure part and the container (closure unit without pouring part) or between the closure part and the pouring part (closure unit with pouring part and closure part) a tight connection can be formed and then removed again with simple manipulations.

The tight sealing of the container is the main function of the closure unit and substantially determines the design and material thereof. However, in many cases the closure unit must also fulfil other functions. These are e.g. in the case of large openings a minimum mechanical support function, in the case of a wine bottle cork a minimum gas permeability, for ease of handling e.g. a permanent connection between the container and the closure part, for safety reasons means which render visible from the outside an initial opening and so on. For the case of a closure unit having a closure part and a pouring part, the most important additional function, apart from the in this case irreversible, tight connection to the container, is the reversible seal between the two parts.

Such a multifunctionality of the closure unit makes obvious such a unit made from several materials, because then for each function it is possible to use an optimum, suitable material.

Numerous closure units made from several materials are known, e.g. a screw cap with a sealing insert (functions: stability/positive engagement, sealing), a cork stopper with a tin cap (functions: sealing, making visible the first opening), a clip closure with a metal clip, the ceramic plug and the rubber seal (functions: connection of the container neck and closure part also in the opened state, mechanical stability and sealing). The disadvantage of all these closure units compared with those made from a single material is that manufacture is made more complicated. Each individual part must be separately manufactured, then the individual parts must be assembled and fixed as a unit to the container, or the individual parts must be fitted to the container in separate steps.

Similar disadvantages and numerous desired improvements, which are detailed hereinafter, also occur in the case of closure units formed from a pouring part and a closure part, particularly those closure units, such as correspond to the prior art coated cardboard containers for beverages.

Containers made from coated cardboard for flowable products are in particular widely used in the food industry to contain drinks or beverages. There are essentially two different types. They are either produced as a quasi-continuous tube, then filled in one operation, sealed at both sides and then brought into an e.g. rectangular shape by folding down the corners. Containers produced in this way are completely filled with liquid. Prior to opening, by folding up at least one corner it is necessary to produce a slight vacuum, so that the container can be opened by tearing off a corner region without overflowing. The folded up corner then serves simultaneously as a spout. It is also possible to produce the cardboard container empty and open at one end, which is then filled and is then closed at said open end by folding and welding. Such containers are not entirely filled with liquid. On such containers conventionally a spout is formed by folding up and at this point the container is opened by tearing. The tearing open of the cardboard container is irreversible. Once the container has been opened, it cannot be resealed, which limits the use thereof.

In order to obtain less use-limited cardboard containers of this type, various closure units made from different materials have been created with the aid of which the container can be resealed following the initial opening. Such closure units are fitted to the containers prior to filling and namely in the closed state, because they do not have to serve as filling openings. In order that such a closure unit effectively improves the container and extends the possible uses thereof, but does not unacceptably increase its price, a number of different requirements are made. The following list gives the most important requirements roughly in priority order:

The closure unit must be manufacturable from materials, which are suitable for contact with foods, ecologically unobjectionable and inexpensive.

The closure unit must be inexpensive to manufacture and fit to the container, i.e. the minimum number of operations should be involved in the manufacture and fitting, with ideally a single manufacturing step and a single fitting step.

The closure unit must have a closure part, which can be opened a random number of times and also resealed tightly.

The closure unit must have a pouring part, so that the cardboard container does not have to be folded up for forming a spout.

The closure unit must be such that the container, particularly prior to the initial opening, is able to withstand without damage rough transportation.

The closure unit must be openable without undue force and with simple manipulations, including the first opening.

The closure unit must be hygienic to handle, i.e. its normal handling should not involve any engagement in the pouring opening.

The closure unit must be connected as a whole to the container so as to allow easy handling for any normal container use, i.e. there must be no waste parts at the initial opening and the closure part must be permanently fixed to the pouring part, but at the same time not impede pouring.

The closure unit must be manufacturable in a large number of different variants from the shape and colour standpoints, which satisfy high esthetic demands.

Numerous closure units for such uses are known, which are fitted or fittable to internally coated cardboard containers. Some of these will now briefly be described and compared with an ideal closure unit with respect to the above list of requirements.

Such a closure unit e.g. comprises a pouring part and a screw or snap top, which in the new state are interconnected by a tear or rupture ring, all the parts being made from a thermoplastic material. The pouring part and the top, onto which the tear ring is shaped with a predetermined breaking point, are individually manufactured, fitted to one another, the tear ring and pouring part are welded together and are then fitted to the container mainly by welding to the inner coating and it must be possible to carry out the welding to the container and of the tear ring and pouring part in a single operating step. Measured against the above requirements list this closure unit suffers from the disadvantage that its manufacture and fitting requires an excessive number of working steps, particularly if for hygienic reasons following the assembly of the two parts a cleaning stage is required. In addition, the tear ring constitutes a waste part, which exists following the initial opening. On opening the screw or snap top must be completely removed from the pouring part and is then lost. The screw top must always be circular, the snap top is advantageously circular, so that there are very limited shape possibilities with respect thereto.

Roughly the same disadvantages are encountered in the case of closure units, which within the pouring part have a sealing diaphragm, which must be removed at the initial opening. Such a diaphragm serves as an additional seal prior to the initial opening. Such a diaphragm can usually only be removed by introducing the fingers into the pouring opening, which does not satisfy the requirement of hygienic handling.

Other closure units with sealing diaphragms in the pouring opening are provided with perforating or puncturing parts, which must be introduced through the diaphragm either manually (hygiene!) or automatically on the initial unscrewing of the screw top. Such closure units are only manufacturable in a large number of steps, but can have as the additional advantage in the puncturing part a venting channel, which permits uninterrupted pouring even when the spout is relatively narrow.

Closure units with snap tops can be moulded in one piece, the pouring part (with or without an additional sealing diaphragm) being connected by means of a connecting part, said connecting part also serving as a permanent connection between the two parts. Although such closure units fulfil the requirement of one-step manufacture, they must be closed following the latter, which means a further production step. This can be obviated in that a diaphragm is moulded in the pouring part and which has an adequate stability to provide an adequately stable closure for the container prior to the initial opening. In such a case the container can be made commercially available with an "opened" closure unit. If such closure units are compared with the requirements list, it can be seen that although manufacture is possible in one step, it requires extremely complicated moulds and the design of the top is very limited from the material standpoint, although only to a much lesser extent from the shape standpoint. The material of the entire closure unit must be easily tightly connectable, e.g. by welding to the container and normally to the coating and is consequently defined within narrow limits. As the cardboard container is usually coated with polyethylene, the complete closure unit is also made from polyethylene and can consequently not satisfy higher esthetic requirements.

Much the same applies with regards to closure units which largely comprise a closing diaphragm, which is initially opened along a predetermined breaking point and on which a sealing lip is shaped in such a way that it can fulfil the sealing function on reclosing. Such closure units can be manufactured very inexpensively, but in the new state are made sensitive by the exposed predetermined breaking point. These closure units can also not satisfy high esthetic demands. Such a closure unit can also not ensure adequate sealing following initial opening.

Clearly none of the above-described closure units satisfies the complete list of requirements.

SUMMARY OF THE INVENTION

The object of the invention is to so improve multifunctional, one-piece and two-piece closure units and to provide a process for the production thereof in such a way that the closure units have the advantages of closure units made from several materials, but can be manufactured much more simply and also easily fitted to the container. In addition, two-part closure units (with pouring part and closure part), particularly those closure units for coated cardboard containers for beverages, are to be improved in such a way that they better satisfy the most important requirements of the aforementioned list and also fulfil more requirements from within said list.

The closure unit of the present invention is made from at least two different thermoplastic materials, which differ with respect to at least one property. They have interconnected, normally one-piece areas made from different materials, which fulfil different functions. The areas made from the individual materials are interconnected by "interengagement" without connecting means. The interengagement can be macroscopic, in that the individual parts are so shaped or moulded, that they are integrated with one another by positive engagement and/or can be microscopic in that the surfaces of the different materials are melted or welded in one another. This interengagement of the materials is at least partly irreversible, i.e. can only be cancelled out when the material areas are at least partly destroyed, but can also be partly reversible (reversible connection between the pouring part and the closure part).

The closure unit of the present invention is produced by intermoulding of the different materials (multimaterial injection moulding procedure). The principle of multimaterial injection moulding is to mould a blank from a first thermoplastic material, sufficiently cool the same to ensure that it is adequately mechanically stable to serve as a mould, at least partly replace the mould used for moulding the blank and mould the finished moulding with a further, thermoplastic material, in that the blank partly serves as a mould. This leads to mouldings, which have contact surfaces between the two materials. In the same way it is also possible to mould mouldings from more than two materials.

One advantage of this multimaterial injection moulding procedure is based on the fact that it permits the moulding of parts integrated into one another, which otherwise could only be produced by more or less complicated assembly or fitting stages. Thus, parts connected by positive engagement are moulded, said positive engagement being reversible or irreversible as a function of the design and elasticity of the material.

The other advantage of multimaterial injection moulding is that through the choice of the different materials used and by the guidance of the moulding process, it is possible to influence the contact surfaces between the materials. As a function of the characteristics of the thermoplastic materials used and the conditions during moulding, the material moulded onto an already moulded material will remelt the same to a varying degree and will mix to a varying degree therewith. Thus, in the case of corresponding material pairing and/or corresponding guidance of the moulding process, it is possible to produce contact surfaces with widely varying characteristics. For example, the two materials can be firmly welded together, but can also only slightly adhere to one another, or the two materials can merely be in contact without any adhesion. Welded contact surfaces are e.g. obtained in that the same materials, which e.g. differ by their colour, are moulded in one another, the strength of the weld being inter alia dependent on the temperature in the areas of the contact surface during the moulding of the second material. Contact surfaces without adhesion are obtained in that materials which do not mix in the plastic state are moulded on one another. If the mixing of the two materials is temperature-dependent, then as a function of the temperatures in the vicinity of the contact surfaces different adhesion strengths can be obtained during moulding. Different adhesion strengths can also be achieved by the so-called polyblend method, in which to the second material is added a variable percentage of the first material, e.g. 10% for easy adhesion.

The two advantages of the multimaterial injection moulding procedure are fully utilized for producing the closure units according to the invention. The following boundary conditions apply. The materials used are primarily determined on the basis of their different functions. The contact surfaces between the areas of different materials are irreversibly interconnected throughout on one-piece closure units. On two-piece closure units they are reversibly interconnected where they simultaneously constitute the separating surfaces of the two parts. Two-piece closure units can be moulded in the closed state using the process described.

Around the container opening each closure unit must be tightly connectable to the container surface. This is the basic function of the closure unit and is fulfilled by an area of said unit which is made from a basic material. The characteristics of the basic material are consequently largely determined by this function. The basic function is reversible for a one-piece closure unit. The basic function is irreversible for a two-piece closure unit, whilst a reversible tight connection must be provided between the pouring part and the closure part.

The reversible connection between the pouring part and the closure part is an unavoidable additional function linked with the basic function of the closure unit and in the case of the inventive two-piece closure unit is fulfilled by a sealing surface pair, one sealing surface of the pair being made from the basic material and the other from the additional material, the two materials being chosen in such a way that on moulding on one another they are only sufficiently strongly welded together that they can be separated from one another without destruction. The positive engagement means necessary in order to interconnect in stable manner the closure part and the pouring part, can either be made reversible by a corresponding shape (e.g. thread) or by a corresponding elasticity (snap closure) of the participating materials.

The seal between the pouring part and the closure part is ensured by an extremely good matching form of the sealing surface pairs (one sealing surface serving as a form for the other during manufacture), which brings about an adhesion between the two sealing surfaces. In addition, the two participating materials can be so chosen with respect to the thermal expansion coefficient and the process performance with respect to the temperatures, that the intermoulded parts are under a slight tension, which presses together the sealing surfaces. In the new state limited welding between the two parts can form an additional seal, but this is lost at the time of initial opening.

As the injection moulding process requires high temperatures and as after moulding no working step is required, in which any inner surfaces of two-part closure units could come into contact with foreign objects, they satisfy all the hygienic requirements without any special cleaning stage. The reversible positive engagement means between the pouring part and the closure part can be released a random number of times and then closed again and for sealing purposes several, e.g. outer and inner sealing surfaces can be provided. The pouring and closure parts can, besides areas made from different materials (sealing surface pairs), also have areas made from the same material, which are interconnected by means of predetermined breaking points and can therefore serve as additional sealing means in the new state. Such connection points can also be constructed as a permanent connection between the closure and pouring parts. Whereas one material forming the part of the closure unit which is connected to the container is mainly determined by this function, the second material can be freely selected within wide limits, but always provided that it can be moulded to the first material without excessively coalescing therewith. At a limited extra cost and e.g. for decorative purposes, further areas from different materials can be moulded, which only differ e.g. by the colour of the additional material. Particularly if the closure part is permanently connected to the pouring part, the possible shapes of the closure part are almost unlimited.

Closure units made by the multimaterial injection moulding process can e.g. be produced from the material pairs polyethylene/polystyrene, polypropylene/styrene-butadiene or polypropylene/polyethylene, all of which are suitable for contact with foods, are ecologically unobjectionable and inexpensive.

BRIEF DESCRIPTION OF THE INVENTION

Embodiments of inventive one-part and two-part closure units of the present invention are described in conjunction with the following drawings, wherein.

Figure 3:
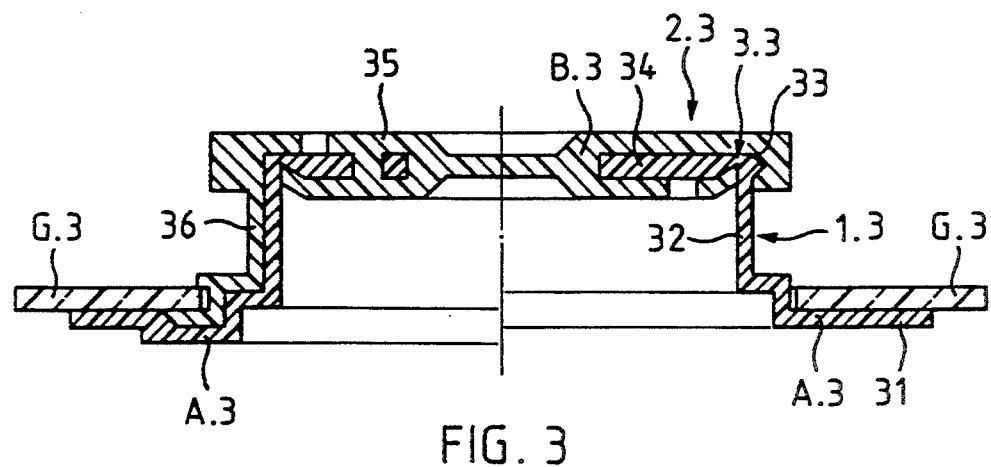
FIG. 3 is a further exemplified, two-part embodiment of the closure unit in section.
Figure 4:
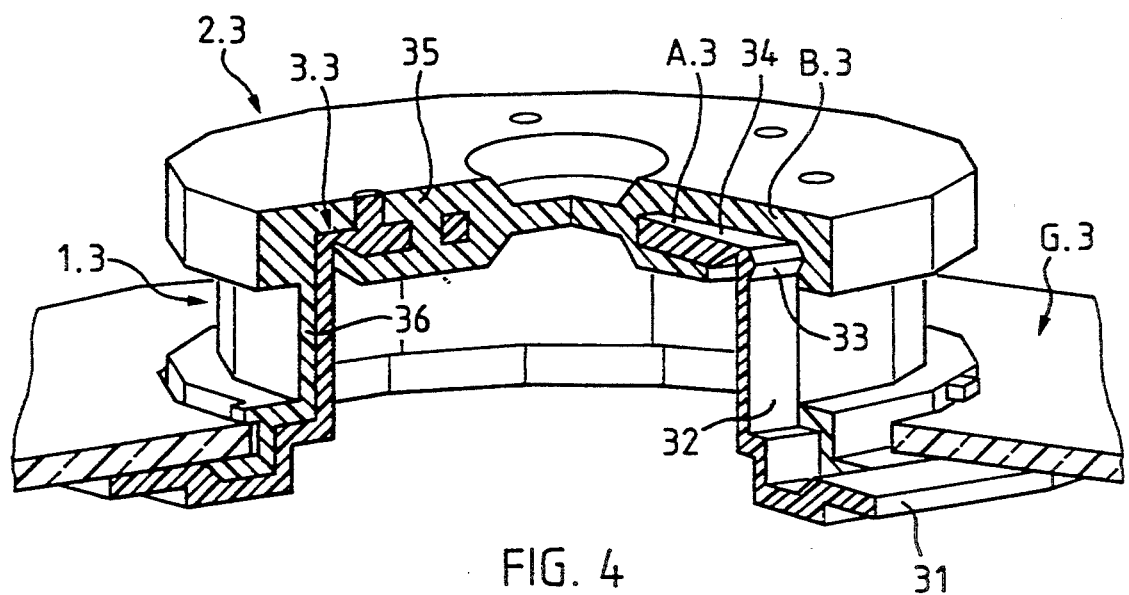
Figure 5A:
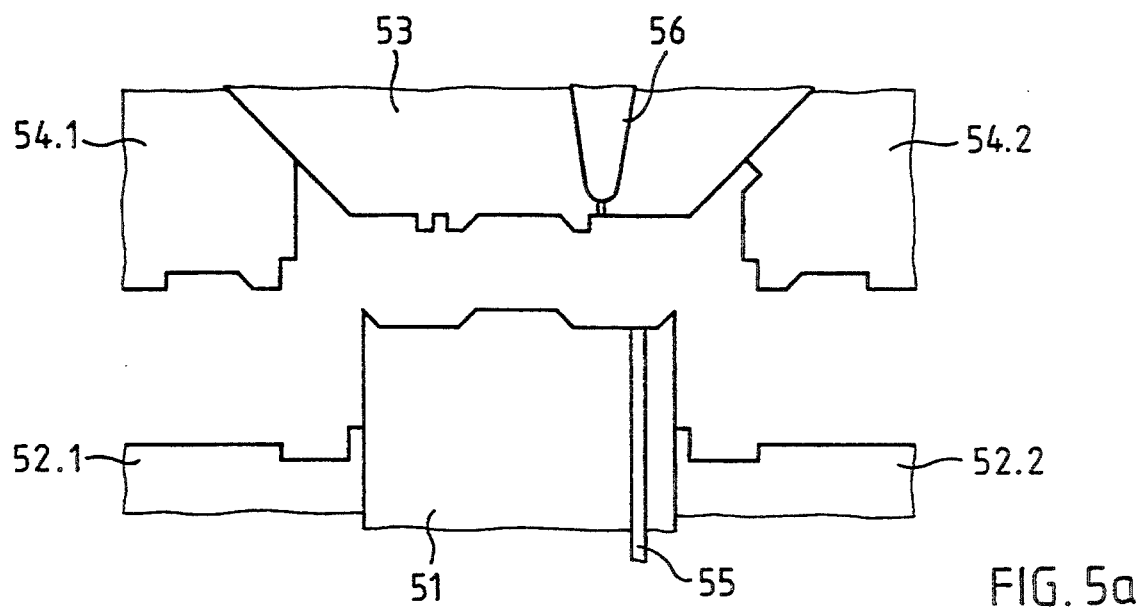
Figure 5B:
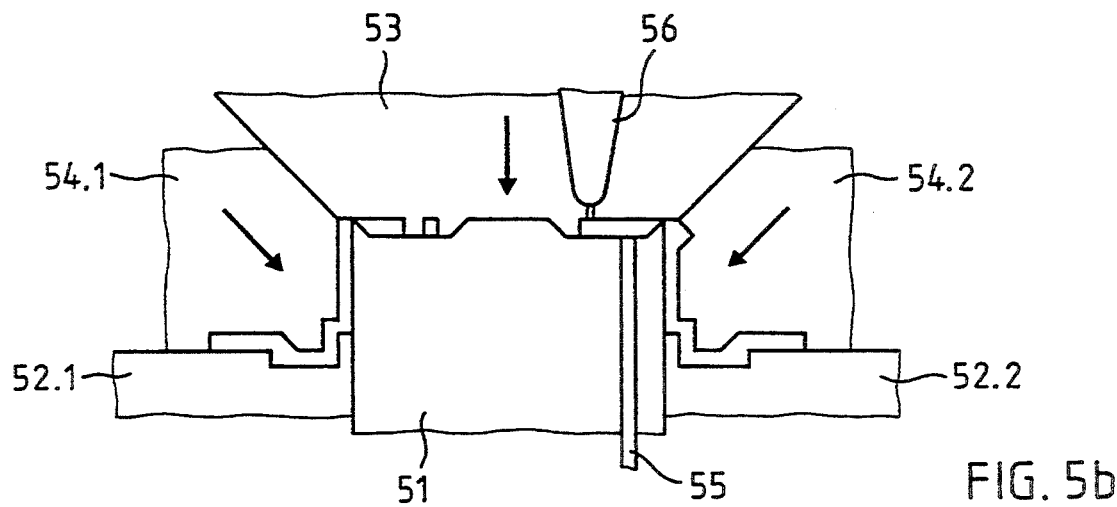
Figure 5C:
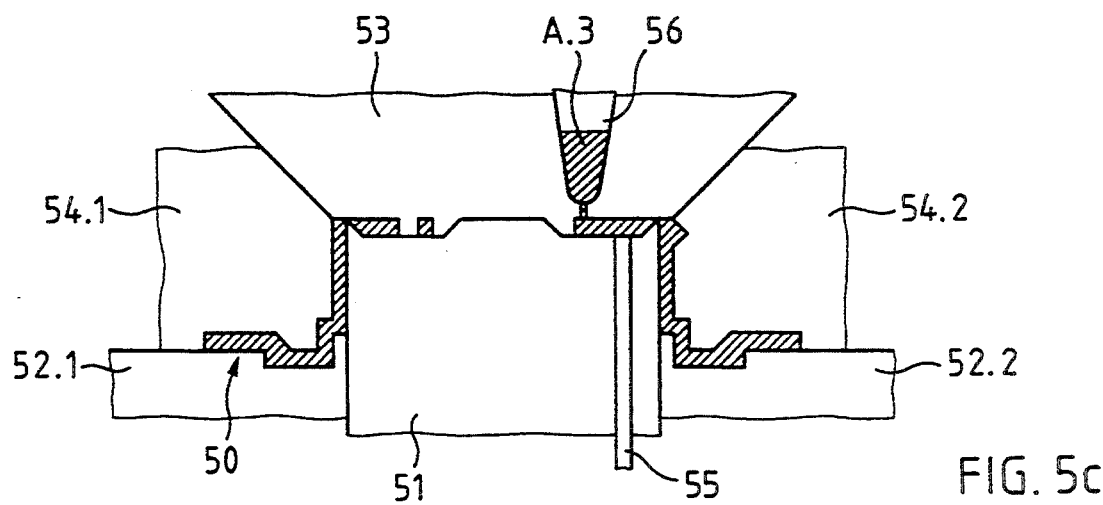
Figure 5D:
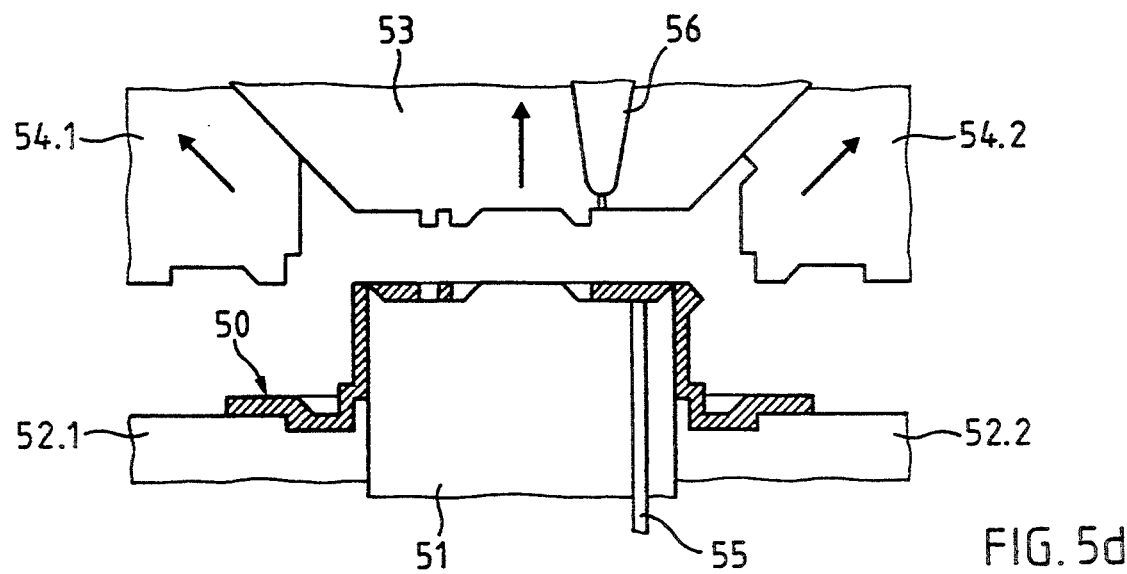
Figure 5E:
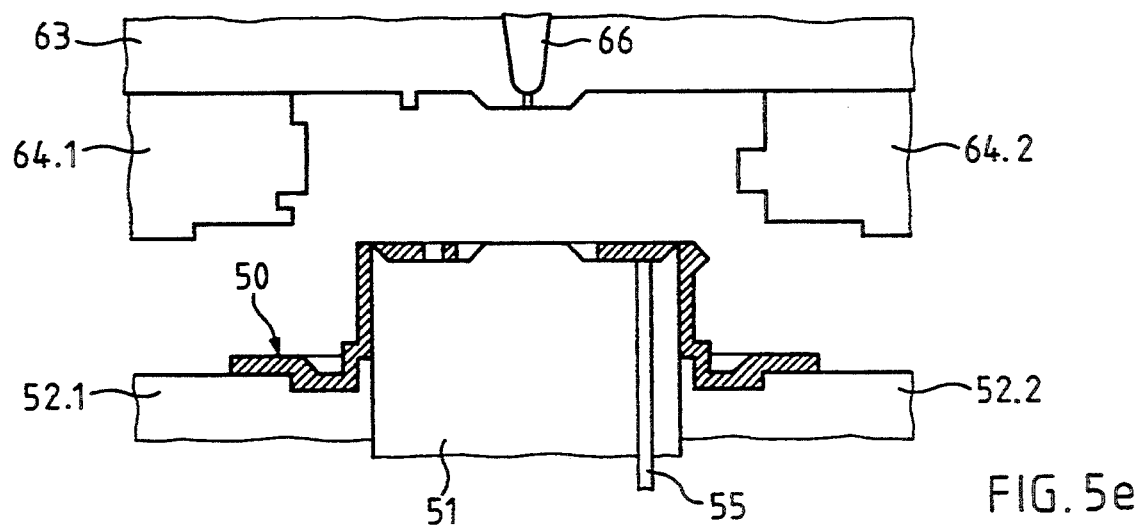
Figure 5F:
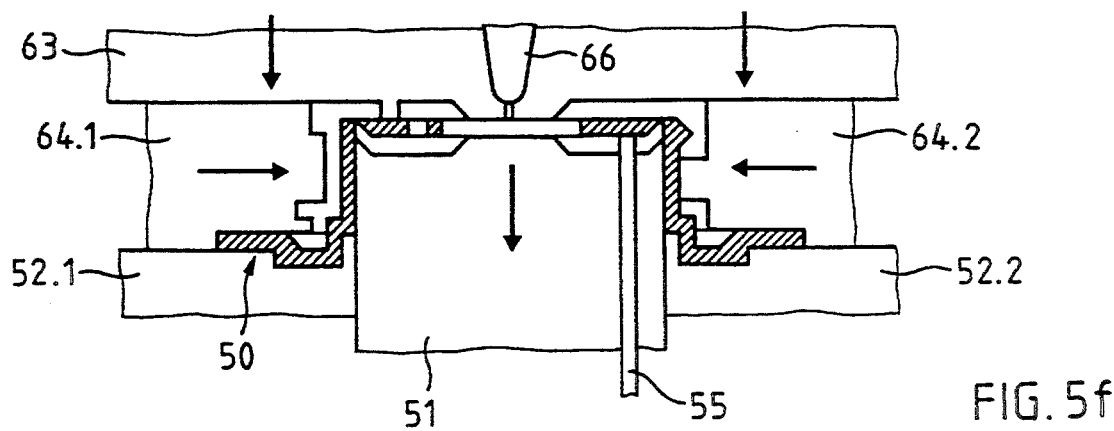
Figure 5G:
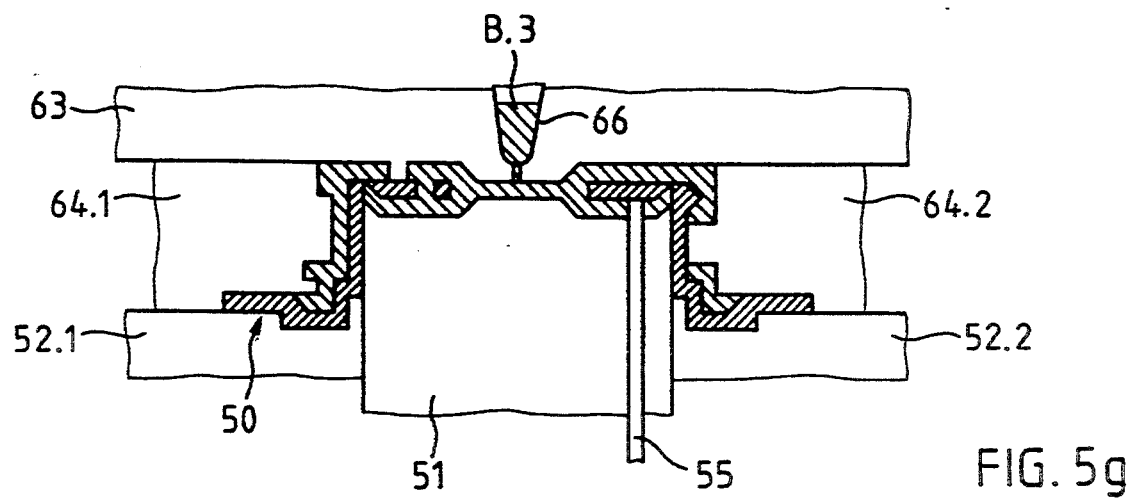
Figure 5H:
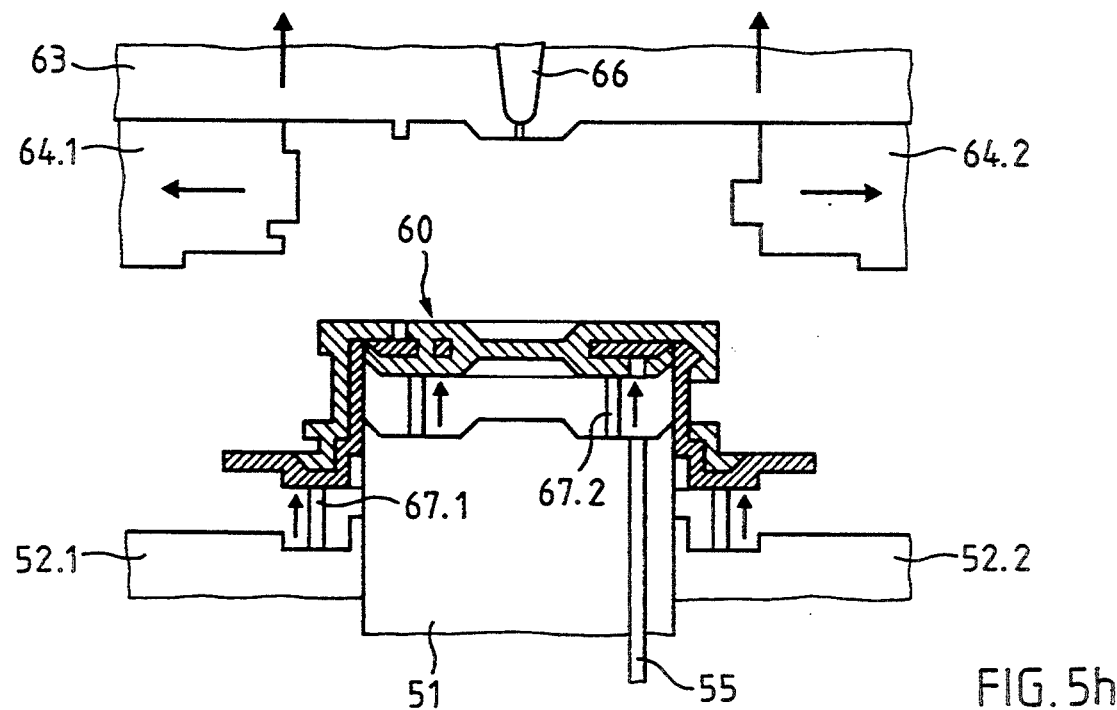

FIG. 4 the embodiment according to FIG. 3 in a part sectional, three-dimensional representation.

FIGS. 5a to 5h show the sequence of the inventive process for the production of the exemplified embodiment of the inventive closure unit according to FIGS. 3 and 4.

Figure 6:
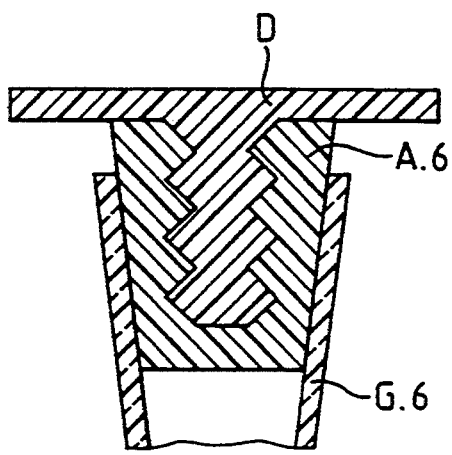

FIG. 6 is a section through an exemplified, one-part embodiment of the closure unit of the present invention.

Figure 7:
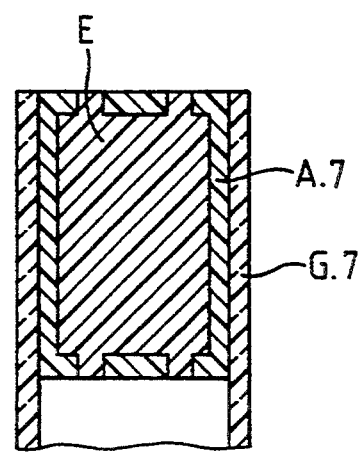

FIG. 7 is a section through a further exemplified embodiment.

DETAILED DESCRIPTION

Figure 1B:
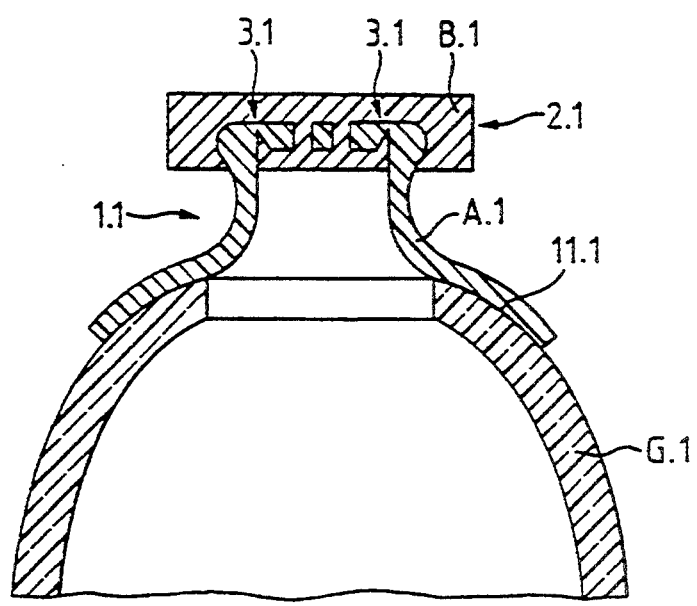
FIGS. 1a and 1b are sections through an exemplified, two-part embodiment of the closure unit of the present invention with an additional sealing function only, in the open (FIG. 1a) and closed (FIG. 1b) state.
Figure 1A:
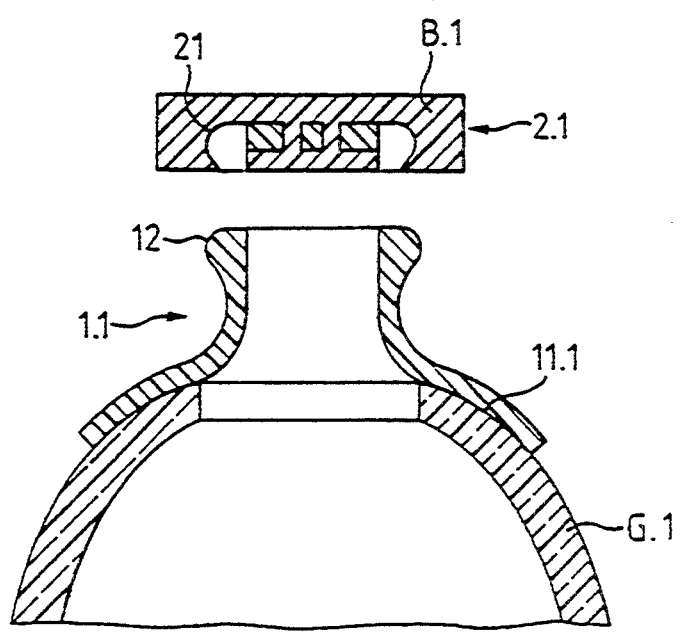

FIGS. 1a and 1b show an exemplified, two-part embodiment of the closure unit according to the invention in the open (FIG. 1a and closed (FIG. 1b) state. The closure unit comprises a pouring part 1.1 and a closure part 2.1, which in the closed state (FIG. 1b) are connected by elastic positive engagement means. It has areas made from a basic material A.1 and areas made from an additional material B.1, which are in each case connected. The closure unit can be manufactured by a multimaterial injection moulding process in the closed state and in one piece.

The pouring part 1.1 is equipped with a closed sealing surface 11.1, which is designed in such a way that around an opening of the container G.1 it can form a tight connection with the container surface. The pouring part 1.1 is made from the basic material A.1, which must have the characteristic that it can form a substantially irreversible, tight connection with the material of the container surface, e.g. by welding or gluing. In addition, the basic material A.1 must be compatible with the product to be stored in the container. The closure part 2.1 is made from the additional material B.1, but can also have parts made from the basic material A.1, as shown in FIGS. 1a and 1b.

The sealing surface pairs fulfilling the reversible sealing function between the pouring part 1.1 and the closure part 2.1 are in each case formed from the basic material A.1 (sealing surface 12) and the additional material B.1 (sealing surface 21). These surfaces must be separable from one another on opening the closure, but without being destroyed and this determines one property of the additional material B.1. The plastic additional material B.1 must only coalesce with the plastic basic material A.1 to such an extent that the release does not involve an undue amount of force when opening the closure unit.

If the basic material A.1 extends in continuous areas from the pouring part 1.1 into the closure part 2.1, then at the potential separation point there must be a predetermined breaking point 3.1, where the basic material can be broken with limited force. Such a predetermined breaking point has the additional advantage that it forms an additional seal between the pouring part and the closure part for as long as said two parts are still unseparated. If such a predetermined breaking point is located at a position where it is readily visible, it can also serve as a "seal" and indicate whether the closure unit is new or has already been opened.

The area made from the basic material A.1 and integrated into the closure part 2.1 is advantageously connected by irreversible positive engagement with the area made from the additional material B.1, so that the closure part can be removed in one piece from the opening. It can also fulfil numerous different functions and is correspondingly designed. As stated, such functions are e.g. the sealing function in the new state and the seal function. The basic material A.1 in the closure part 2.1 can also have a mechanical stability function, so that the additional material B.1 can be made correspondingly weak. If the additional material B.1. only has limited compatibility with the product to be stored in the container, the area of the closure part 2.1 made from the basic material A.1 can also cover its entire inner surface, so that at least in the new state the product does not come into contact with the additional material B.1.

Variants are also conceivable in which the pouring part 1.1 has areas made from the additional material B.1 and are connected by a predetermined breaking point with the corresponding areas of the closure part 2.1. It is also possible to have embodiments in which the pouring and closure parts have areas of both materials and in each material there are predetermined breaking points. Embodiments are also conceivable in which the pouring part is only made from the basic material and the closure part only from the additional material, so that then they need have no predetermined breaking points.

An exemplified use for a closure unit according to FIGS. 1a and 1b is for a bottle for highly viscous liquids, e.g. syrup, which has a pouring part with improved pouring characteristics compared with the bottle neck and made from polyethylene, as well as a top having an internal polyethylene coating and two external polystyrene coatings.

Figure 2:
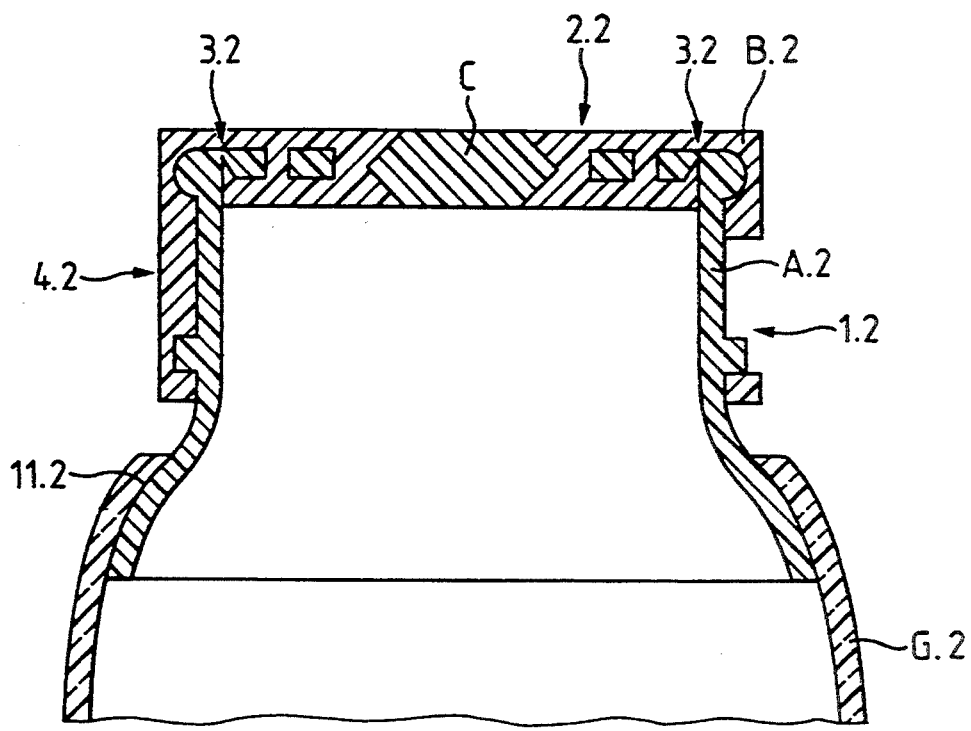
FIG. 2 is a section through another exemplified embodiment with further additional functions.

FIG. 2 shows an embodiment of the inventive closure unit having further additional functions. Like the embodiment of FIGS. 1a and 1b, it comprises a pouring part 1.2 and a closure part 2.2. The basic material A.2 forms areas of the pouring part 1.2, particularly the sealing surface 11.2, which forms a tight, irreversible connection with the surface of a container G.2, and areas of the closure part 2.2. These areas are connected by a predetermined breaking point 3.2 and have a similar design to the corresponding areas of the embodiment shown in FIGS. 1a and 1b. The additional material B.2 also forms areas of the pouring part 1.2 and the closure part 2.2.

The pouring part 1.2 has an inner area made from the basic material A.2 and an outer area made from the additional material B.2, the outer area e.g. only partly surrounding the inner area and is fixed to the latter by positive engagement means. If e.g. in the vicinity of 4.2 there is a predetermined breaking point, the additional material B.2 fulfils the seal function, because a break at this point is readily visible. If there is no predetermined breaking point at 4.2 and the area is correspondingly designed so that the closure unit can also be opened without having to separate the pouring and closure parts here, then this point fulfils the function of a permanent connection between the neck and closure part.

Two-part closure units according to the prior art with or without a permanent connection between the pouring and closure parts can be made in one operation from one material according to known processes. However, they must be produced in the open state, so that closing involves a further operation. The important advantage of the inventive closure unit made from two different materials is that it can be produced in the closed state in one operation, which is particularly advantageous in the case of containers, where the opening of the closure unit is not necessary for the filling of the container content (e.g. coated cardboard containers).

The embodiment shown in FIG. 2 can have a further additional function taken over from an area in the closure part made from a further additional material C. The latter can e.g. be so porous that although it tightly seals the container with respect to its content, it allows a gas exchange between the interior of the container and the external air, so that the container content can age in controlled manner. The additional material can also be so elastic that it can e.g. be perforated by a hollow needle and the perforation can reseal after the removal of the needle. Therefore the area made from the further additional material C fulfils an additional removal or addition function, which can be carried out with the closure unit closed. It is also conceivable for the area made from the further additional material C to be sealed with respect to the outside by the additional material B.2 and for the further additional material C to have absorption characteristics. In areas of additional material C, it is possible to store a material by absorption which can have a controlled interaction with the container content. Examples of such materials are flavouring agents, vitamins or preservatives.

The design of the area from the further additional material C is on the one hand dependent on its function and on the other on the material pairing of the materials A.2 or B.2 and C. If they can be sufficiently strongly welded in the case of intermoulding in the micro and/or macro range, simple shaping is possible, but if they cannot be welded, as shown in the drawing, then positive engagement means are required.

It is obviously also possible to have embodiments of the inventive closure unit with only some of the additional functions described in conjunction with FIG. 2, as well as those having further additional functions.

FIGS. 3 and 4 show in section (FIG. 3) and in part sectional view (FIG. 4) another exemplified, two-part embodiment of the inventive closure unit in detail. It is once again a unit formed from a basic material A.3 and an additional material B.3, which is particularly suitable for use on a coated cardboard container and whose pouring part 1.3 and closure part 2.3 have areas from both materials A.3 and B.3.

The pouring part is designed as a substantially tubular part, which may or may not be circular, on whose end remote from the closure part is shaped a flange-like connecting ring 31, which is e.g. welded to the inner coating of the container G.3. The connecting ring 31 and also the pouring tube 32 of the pouring part 1.3 are made from the basic material A.3. In order that the inner coating of the container G.3 and the connecting ring 31 can be easily welded together, e.g. for a polyethylene-internally coated container, polyethylene is advantageously chosen as the basic material A.3. A bead 33 is provided as a positive engagement means on the outer end of the pouring tube 32 facing the closure part 2.3. The area made from the basic material A.3 extends into the closure part 2.3 and namely via the entire opening of the pouring tube 32, a predetermined breaking point 3.3 being provided around the latter.

The closure part 2.3 is made from both materials (A.3, B.3), an inner area 34 is made from the basic material A.3, an outer area 35 surrounding the inner area on both sides is made from the additional material B.3. Both areas are provided with openings which, as will be described hereinafter, are mainly a result of the moulding process. The closure part has a channel or groove corresponding to the bead 33. The area made from the additional material B.3 on the outside of the pouring tube extends in the form of a web 36 to below the container wall, where it is positively secured between the container G.3 and the connecting ring 31. The web 36 is e.g. used as a permanent connection between the closure part and the pouring part.

The sealing surface pairs between the pouring part 1.3 and the closure part 2.3 according to FIGS. 3 and 4 and which can be arranged on the outside and/or inside of the pouring tube 32, in each case comprise a sealing surface made from the basic material A.3 on the pouring side and a sealing surface made from the additional material B.3 on the closure side. In the case of a given basic material A.3 (connection to the container), the additional material B.3 is also determined by the requirement that it must be possible to weld together the sealing surface pairs, without any excessive coalescing of the materials. A weld between the sealing surfaces, whose separation does not excessively increase the force required for opening the closure unit can be accepted, or may even be desirable as an additional seal for the new state. For good sealing a limited tension between the pouring part 1.3 and the closure part 2.3 is also desired through which the sealing surface pairs are pressed against one another. Such a tension can e.g. be achieved in that the two materials are so chosen that the additional material B.3 has a higher thermal expansion coefficient and the basic material A.3 a lower thermal expansion coefficient, so that on cooling the additional material B.3 shrinks more and consequently the outer sealing surface pairs are pressed onto one another in the vicinity of the bead 33. If the thermal expansion coefficient of the basic material A.3 is higher than that of the additional material B.3, the pouring tube 32 will shrink more than the closure part and will exert a pressure in areas of the inner sealing surface pairs. These tensions desired for a good sealing action can be achieved not only through a corresponding material selection, but also by a corresponding guidance of the moulding process, in which the two materials do not have the same temperatures when moulded on one another, as well as by corresponding shaping of the areas of the different materials.

The closure unit according to FIGS. 3 and 4 is manufactured in the closed state by a two-stage injection moulding process, which will be described in greater detail in conjunction with FIGS. 5a to 5h. At the time of initial opening, i.e. on raising the closure part 2.3 from the pouring part 1.3, the area of the basic material A.3 breaks along the predetermined breaking point 3.3 and is divided into two parts, the additional seal formed by the area of the basic material A.3 when the container is new and extending from the pouring part 1.3 into the closure part 2.3 is destroyed. The area made from the additional material B.3 is deformed in areas of the web 36, but remains in tact, so that the pouring part 1.3 and the closure part 2.3 remain permanently interconnected.

The following variants of the embodiment shown in FIGS. 3 and 4 and which have in part already been mentioned in conjunction with FIGS. 1 and 2 are conceivable.

The pouring tube 32 can have a non-circular pouring opening, particularly if between the closure part and the pouring part there is a permanent connection and therefore, even without special attention, the closure part can be placed on an opening having a less pronounced symmetry.

The area made from the basic material A.3 can be limited to the pouring part, so that there is no need for the additional seal by the predetermined breaking point 3.3 in the new state.

The area made from the additional material B.3 can also be restricted to the closure part 2.3, i.e. the web 36 can be omitted, so that the permanent connection between the pouring and closure parts is obviated.

The area of the additional material B.3 extending into the pouring part 1.3 can be anchored by positive engagement means to the area of the basic material A.3 without coming into contact with the container G.3.

The closure unit, particularly the closure part 1.3, can have areas of a third material, which can fulfil a further function or serve decorative purposes (cf. also FIG. 2).

Instead of being in three-layer form (B/A/B), the closure part need only be in two-layer form (B/A or A/B).

The connecting ring 31 can be connected to the outer surface of an externally coated container (cf. also FIG. 1).

FIGS. 5a to 5h show an example of an manufacturing process illustrating the production sequence for the embodiment of the closure unit according to the invention, as described in conjunction with FIGS. 3 and 4. The drawings show in time-succeeding manner the following states of the moulded product and moulding means in section.

State 5a shows the moulding means for moulding the blank from the basic material A.3. The moulding means are parts 51,52.1,52.2,53, 54.1,54.2 of a mould which can be moved relative to one another and which have spacing means, e.g. rods 55 movable relative to a means 51 and ejecting means (not visible in this state), together with a moulding nozzle 56.

State 5b is the moulding state of the moulding means for moulding the blank e.g. from the basic material G.3. In this state the means form a closed mould, which is obtained in that means 51,52.1 and 52.2 remain stationary, whereas means 53,54.1 and 54.2 move (arrows).

State 5c is the state during the actual moulding of the blank 50 from the basic material A.3 and which is injected by the moulding nozzle 56.

States 5d,5e and 5f show the replacement of the mould after moulding the blank. Moulding means 53,54.1 and 54.2 are removed (state 5d, arrows) and are replaced by means 63,64.1 and 64.2 (state 5f, arrows). In addition, the means 51 is moved relative to the spacing means 55 in such a way that between the blank 50 and the means 51 a new moulding cavity is obtained and the blank is kept by the spacing means 55 in its original moulding position. The blank 50, spacing means 55 and means 51 (in the new position), 52.1, 52.2 (in the original position), 63,64.1 and 64.2 now form a closed mould for the finished moulded product.

State 5g is the state during the effective moulding of a second material, e.g. the additional material B.3, which is supplied by the moulding nozzle 66.

State 5h shows the moving away of the means 63,64.1 and 64.2 (large arrows) and the raising of the moulding 60 from the means 51,52.1 and 52.2 by the ejecting means 67.1 and 67.2 (small arrows).

The complete moulding process is e.g. performed at two moulding locations (one for the states 5a to 5d and the other for the states 5e to 5h), between which oscillate or travel the moulding means 51,52.1 and 52.2 (in one direction with the blank). The cycle time, i.e. the time required to manufacture a closure unit is then the time required for passing through the states 5a to 5d or 5e to 5h. The cycle time can be further reduced by several moulding locations functioning in parallel.

Part of the moulding of the blank and the finished moulding is based on the moulding procedure used. If additional material is to be moulded round both sides of the blank, it must have corresponding openings. Additional material cannot be moulded entirely round the blank, because the latter must be held in the moulding position for the second moulding stage by means (moulding means 52.1 and 52.2, spacing means 55).

In order to keep the costs for the multimaterial injection moulding process to within acceptable limits, it is important for the moulding means not to have an excessively complicated shape and for the cycle time, i.e. that required for a moulding cycle from state 5a to state 5d is as short as possible. The cycle time can be kept short if it is ensured that the parts to be moulded are so thin that they can be sufficiently cooled during the time which must be expended for moving the means, so as to be sufficiently stable for the next state. This is inter alia achieved in that parts which must have a specific thickness for a specific mechanical strength are moulded from both materials in two or three layers. The closure part of the embodiment described in conjunction with FIGS. 3 and 4 is designed on this basis.

FIG. 6 shows a one-part embodiment of the inventive closure unit, which has no additional sealing function as a result of its one-part nature. It is a plug made from two materials, the basic material A.6 fulfilling the sealing function, which is in this case reversible, with respect to the container surface (G.6), whilst the additional material D has one or more additional functions, which in the represented case can e.g. be the mechanical strength or an esthetic function. The contact surfaces between the two materials A.6 and D must be irreversibly connected, i.e. the material pairing must be chosen in such a way that the surfaces are welded together on intermoulding and/or the shape thereof is to be so selected that they are positively interconnected. The basic material A.6 is also in this case determined by its sealability with respect to the container surface and by its compatibility with the container content. The additional material D is determined by the additional function and by the requirements concerning the material pairing of the basic and additional materials.

A one-part, inventive closure unit can also be in the form of a screw or snap top.

FIG. 7 shows a further, one-part embodiment of the inventive closure unit. It is an embodiment in which the additional material E can assume additional functions according to the additional material C of the embodiment of FIG. 2. In such a plug, once again the sealing function with respect to the container surface (G.7) is fulfilled by the basic material A.7 and the additional functions such as mechanical stability, porosity and/or absorptivity are fulfilled by the additional material E.

I claim:

1. A closure unit made from thermoplastic material for closing a container for the handling and storing of a flowable product, the closure unit comprising:

a first continuous area made from a basic thermoplastic material; and at least a second continuous area made from another thermoplastic material which differs from the basic thermoplastic material in at least one property;

said first continuous area having a closed sealing surface which is connectable around a container opening in a tight sealing manner with respect to the container material;

said first and second continuous areas being coupled to one another such that they are separable only as a result of an at least partial destruction of at least one of said first and second continuous areas;

a pouring part which comprises at least a portion of said first continuous area, and which is at least partly made from said basic thermoplastic material; and a closure part for closing said pouring part, said closure part comprising at least a portion of said second continuous area, and said closure part being at least partly made from said another thermoplastic material;

said basic thermoplastic material and said another thermoplastic material having respective properties such that they can be molded onto one another without coalescing;

at least one of said pouring part and said closure part having positive engagement means for engaging the other of said pouring part and closure part; and said pouring part having at least one sealing surface made from said basic thermoplastic material, and said closure part having at least one sealing surface made from said another thermoplastic material, said sealing surfaces of said pouring part and said closure part, in a closed state of the closure unit, resting on one another and together with said positive engagement means forming a reversible, tight connection of said closure part to said pouring part.

2. The closure unit of claim 1, wherein said first continuous area made from said basic thermoplastic material extends both into said closure part and into said pouring part.

3. The closure unit of claim 2 wherein said first continuous area, which extends both into said closure part and into said pouring part, has at least one predetermined breaking point at a transition from said closure part into said pouring part.

4. The closure unit of claim 3, wherein said at least one predetermined breaking point is at least partly located around said pouring opening of the container.

5. The closure unit of any one of claims 1–4, wherein:
said positive engagement means fixes said closure part to said pouring part; and
said positive engagement means comprises at least one bead on an outside portion of said pouring part and a corresponding channel on said closure part.

6. The closure unit of any one of claims 1–4, wherein:
said first continuous area, made from said basic thermoplastic material, forms a connecting ring at an end of said pouring part which is remote from said closure part;
said basic thermoplastic material is a thermoplastic material with which a cardboard container is coated; and
said connecting ring has a surface facing said closure part which is welded to the coating of the cardboard container.

7. The closure unit of any one of claims 1–4, wherein said basic and another thermoplastic materials have respective different thermal expansion coefficients.

8. The closure unit of any one of claims 1–4, wherein said basic and another thermoplastic materials are polyethylene and polystyrene, respectively.

9. The closure unit of any one of claims 1–4, wherein said basic and another thermoplastic materials are polypropylene and styrene-butadiene, respectively.

10. The closure unit of any one of claims 1–4, wherein said basic and another thermoplastic materials are polypropylene and polyethylene, respectively.

11. The closure unit of any one of claims 1–4, wherein said another thermoplastic material contains a small percentage of said basic thermoplastic material.

12. The closure unit of any one of claims 1–4, wherein at least one area of a material extending over said pouring part and said closure part remains cohesive on removing said closure part from said pouring part.

13. The closure unit of any one of claims 1–4, further comprising additional areas of at least one of said closure part and said pouring part made from a further thermoplastic material which is different from both of said basic and another thermoplastic materials.

14. The closure unit of claim 13, wherein said additional areas made from said further thermoplastic material are connected by at least one of positive engagement and contact surfaces melted into one another in an irreversible manner to at least one of said closure part and said pouring part.

15. A process for making a closure unit according to claim 1, comprising:

molding a blank corresponding to said first continuous area from said basic thermoplastic material in a mold;

replacing at least part of the mold, and thereafter molding the second continuous area from said another thermoplastic material in said mold;

said blank forming at least part of the mold for molding said second continuous area from said second thermoplastic material, said second continuous area being connected to said blank during said molding of said second continuous area.

16. In a container made from coated cardboard for containing a flowable product, the container having a closure unit made from thermoplastic material, and the closure unit being fixable on the container, the improvement wherein the closure unit comprises:

a first continuous area made from a basic thermoplastic material;

at least one second continuous area made from another thermoplastic material;

said basic thermoplastic material and said another thermoplastic material differing from each other in at least one property;

the first continuous area having a closed sealing surface which is connectable around a container opening in tight manner with the container material;

the first and second continuous areas being separable only as a result of at least partial destruction of at least one of said first and second continuous areas;

a pouring part which comprises at least a portion of said first continuous area, and which is at least partly made from said basic thermoplastic material; and a closure part fur closing said pouring part, said closure part comprising at least a portion of said second continuous area, and said closure part being at least partly made from said another thermoplastic material;

said basic thermoplastic material and said another thermoplastic material having respective properties such that they can be molded onto one another without coalescing;

at least one of said pouring part and said closure part having positive engagement means for engaging the other of said pouring part and closure part; and said pouring part having at least one sealing surface made from said basic thermoplastic material, and said closure part having at least one sealing surface made from said another thermoplastic material, said sealing surfaces of said pouring part and said closure part, in a closed state of the closure unit, resting on one another and together with said positive engagement means forming a reversible, tight connection of said closure part to said pouring part.

* * * * *